United States Patent [19]
Miyawaki et al.

[11] Patent Number: 5,886,343
[45] Date of Patent: Mar. 23, 1999

[54] IMAGE SENSOR COMPRISING A TWO-DIMENSIONAL ARRAY OF STORING ELEMENTS WITH BOTH ROW AND COLUMN PARALLEL OUTPUT CIRCUITRY

[75] Inventors: Mamoru Miyawaki, Isehara; Isamu Ueno, Hadano, both of Japan

[73] Assignee: Canon Kabushiki Kaisha, Tokyo, Japan

[21] Appl. No.: 964,363

[22] Filed: Nov. 4, 1997

Related U.S. Application Data

[62] Division of Ser. No. 717,680, Sep. 23, 1996, Pat. No. 5,726,439, which is a continuation of Ser. No. 250,488, May 27, 1994, abandoned.

[30] Foreign Application Priority Data

May 28, 1993 [JP] Japan ................. 5-1270890

[51] Int. Cl.$^6$ ................................. H01L 27/14
[52] U.S. Cl. ................. 250/208.1; 257/291; 348/302
[58] Field of Search ............. 250/208.1, 208.2; 257/291, 292, 443; 348/302, 308

[56] References Cited

U.S. PATENT DOCUMENTS

| | | | |
|---|---|---|---|
| 5,032,712 | 7/1991 | Ito | 250/208.1 |
| 5,210,434 | 5/1993 | Ohmi et al. | 250/208.1 |
| 5,241,167 | 8/1993 | Suzuki et al. | 250/201.8 |
| 5,315,102 | 5/1994 | Abe et al. | 250/208.1 |
| 5,351,309 | 9/1994 | Lee et al. | 250/208.1 |
| 5,401,952 | 3/1995 | Sugawa | 250/208.1 |
| 5,406,332 | 4/1995 | Shinohra et al. | 250/208.1 |
| 5,428,420 | 6/1995 | Akashi et al. | 354/408 |

FOREIGN PATENT DOCUMENTS 0 349 027  1/1990  European Pat. Off. ....... H04N 5/335

*Primary Examiner*—David Nelms
*Assistant Examiner*—Andrew Q. Tran
*Attorney, Agent, or Firm*—Fitzpatrick, Cella, Harper & Scinto

[57] ABSTRACT

An image sensor in which a plurality of photoelectric conversion elements are arranged in a two-dimensional form and which has reading circuitry for enabling output signals from the elements in the row direction and output signals from the elements in the column direction to be read out in parallel.

5 Claims, 17 Drawing Sheets

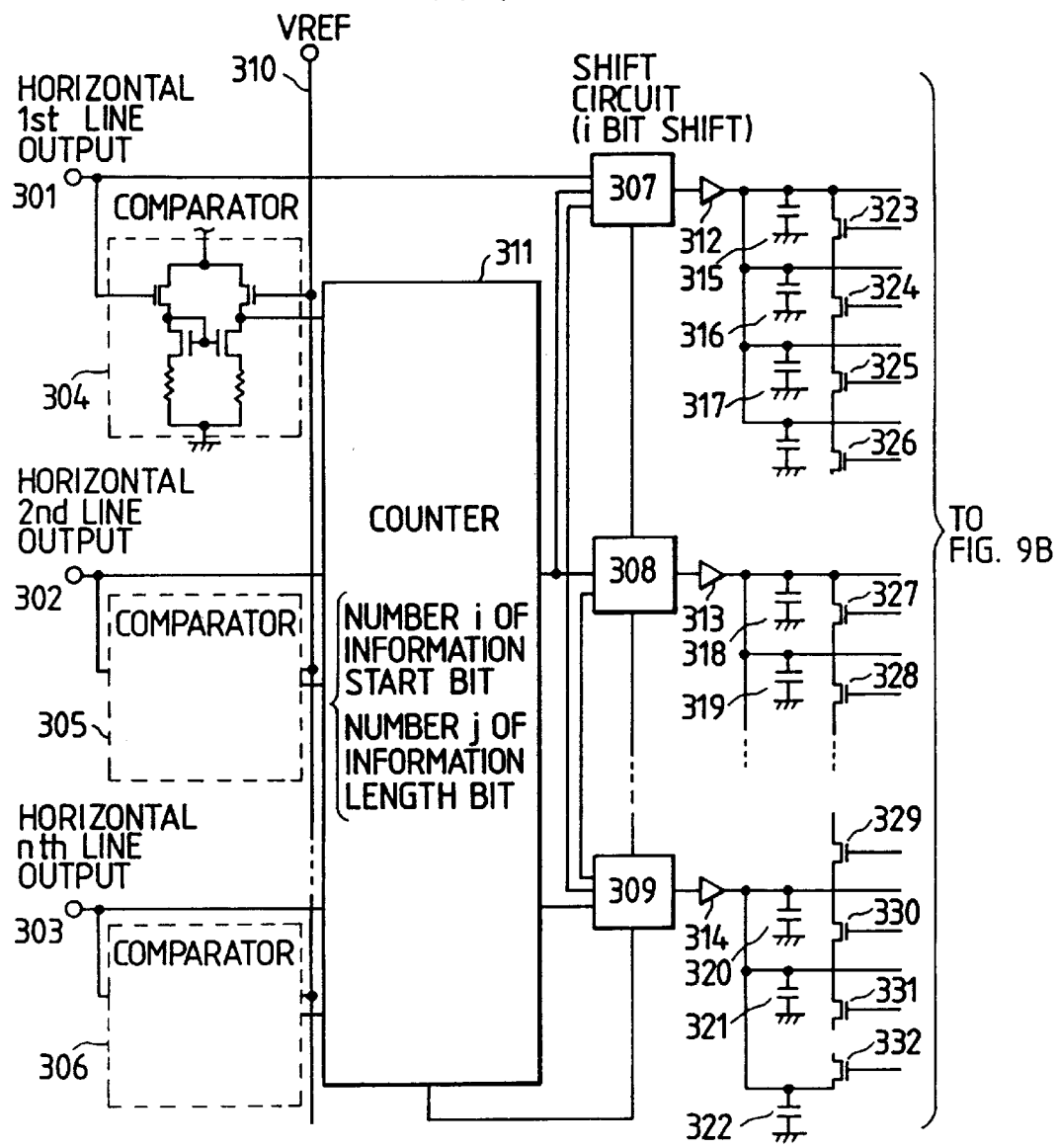

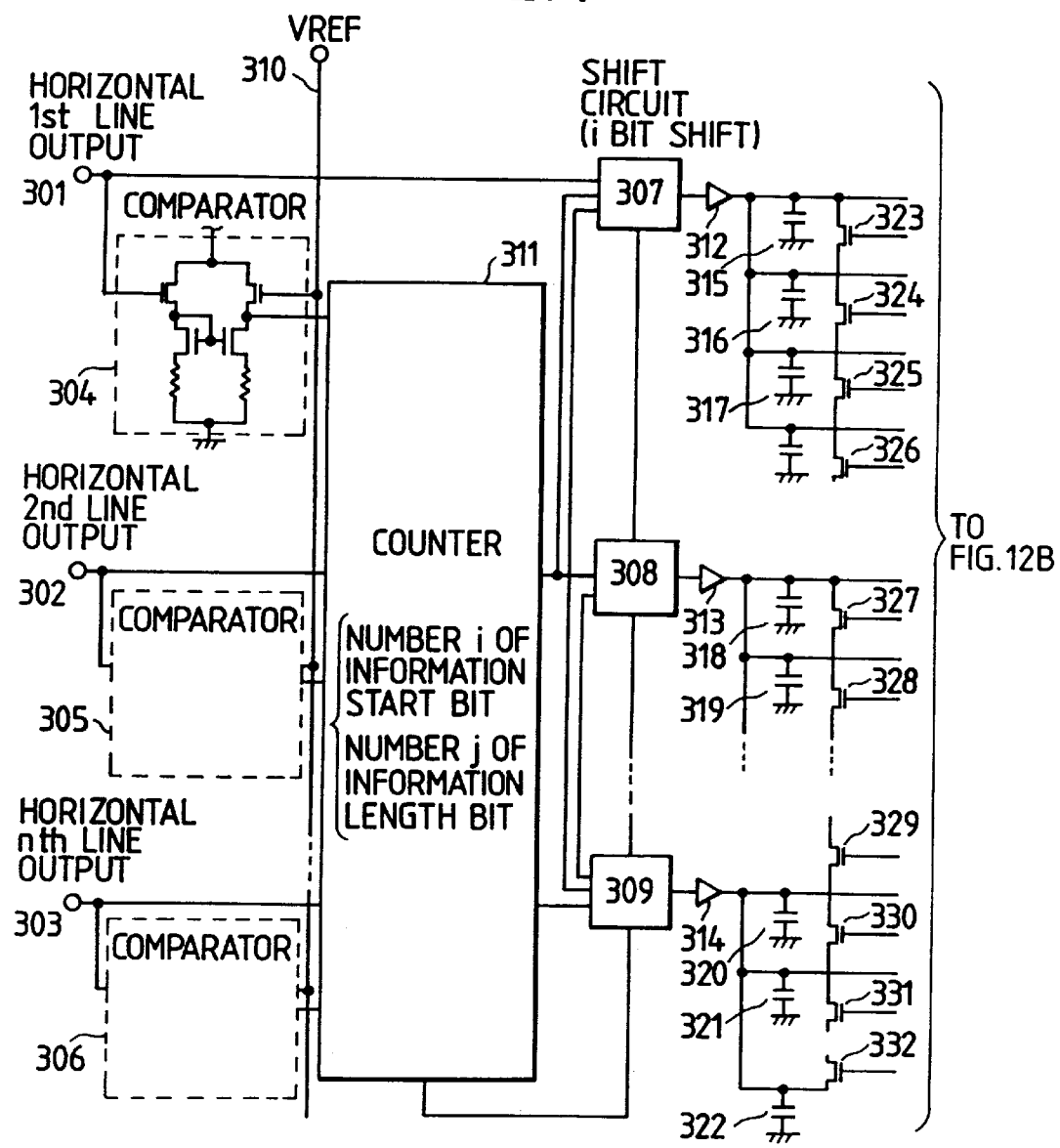

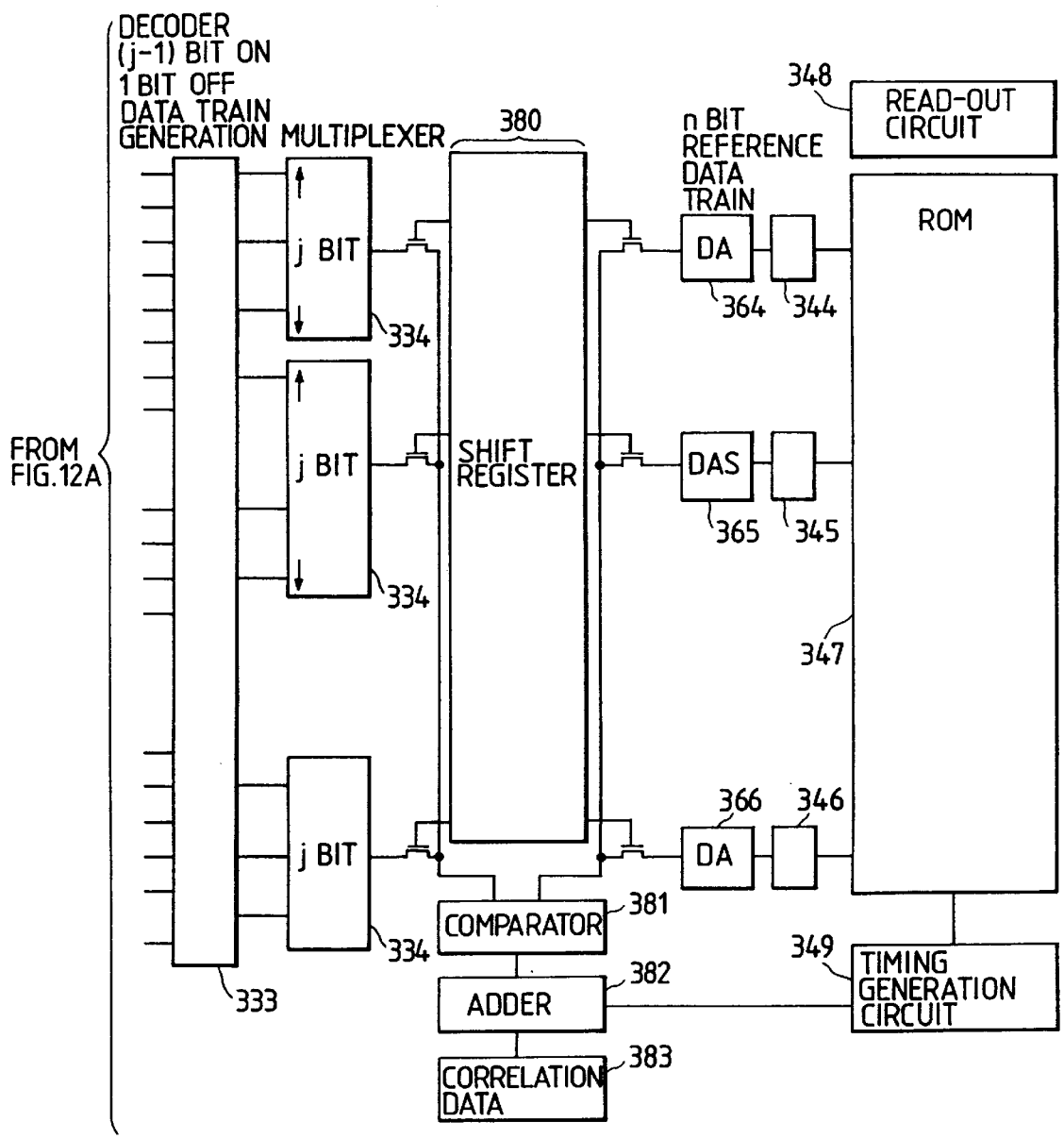

ns5,886,343

IMAGE SENSOR COMPRISING A TWO-DIMENSIONAL ARRAY OF STORING ELEMENTS WITH BOTH ROW AND COLUMN PARALLEL OUTPUT CIRCUITRY

This application is divisional of application Ser. No. 08/717,680, filed Sep. 23, 1996, now U.S. Pat. No. 5,726,439, which is a continuation of application Ser. No. 08/250,488, filed May 27, 1994, now abandoned.

BACKGROUND OF THE INVENTION

1. Field of the Invention

The present invention relates to an image sensor of a copying apparatus, a facsimile apparatus, a video camera recorder, or the like and to an image sensor for an automatic focusing of a camera. More particularly, the invention relates to an image sensor having an image signal process such as pattern recognition, detection of a moving image, or the like.

2. Related Background Art

As a sensor to recognize an image (video image) as an object, there is a report by Kazuo Kyuma, "Optical neural net and intelligent sensor", the lecture papers of the fourth image input technique symposium, pages 71 to 78, Nov. 10, 1992.

The above conventional technique, however, has the following technical subjects.

(1) Since an optical current is read out, it can be read out in only one direction and a pattern recognizing precision is low.

(2) Even in case of (64×64) pixels, it takes a time of 200 μsec for a (outline) process.

(3) Since a Schottky is formed by a comb-shaped Al metal film, a numerical aperture of a photosensitive device is small and a sensitivity is low.

(4) Since a current is read out, a layout pattern of read-out wirings is complicated.

(5) Noises cannot be removed and it is difficult to perform an image process at a high precision.

SUMMARY OF THE INVENTION

It is an object of the invention to provide an image sensor which can solve the foregoing technical subjects and can execute a signal process for performing a noise rejection or the like at a high speed.

According to an embodiment of the invention, the above object is accomplished by an image sensor having read-out means in which a plurality of photoelectric conversion elements are two-dimensionally arranged and output signals from elements in the row direction and output signals from elements in the column direction can be read out in parallel.

According to the embodiment of the invention, since a signal of each of the photoelectric conversion elements is output as a voltage of a floating bus line, the reading operations in the row and column directions can be executed in parallel, and the simultaneous or sequential or batch reading operation can be executed and/or the reading operation in the case where a portion between lines is divided can be also performed. Since a reference voltage of the floating bus line can be set, only the necessary signal can be also detected.

The above and other objects and features of the present invention will become apparent from the following detailed description and the appended claims with reference to the accompanying drawings.

BRIEF DESCRIPTION OF THE DRAWINGS

FIG. 12 is comprised of FIGS. 12A and 12B showing diagrams of further another embodiment of an image processing section of the invention.

DETAILED DESCRIPTION OF THE PREFERRED EMBODIMENTS

According to embodiments which will be explained hereinbelow, the simultaneous or sequential reading operation is time-sequentially executed to a plurality of common read-out lines represented by rows and columns.

As elements which are used in the invention, it is desirable to use non-destructive type sensors for reading out signals to a plurality of coupling capacitors on the output side.

Figure 1:
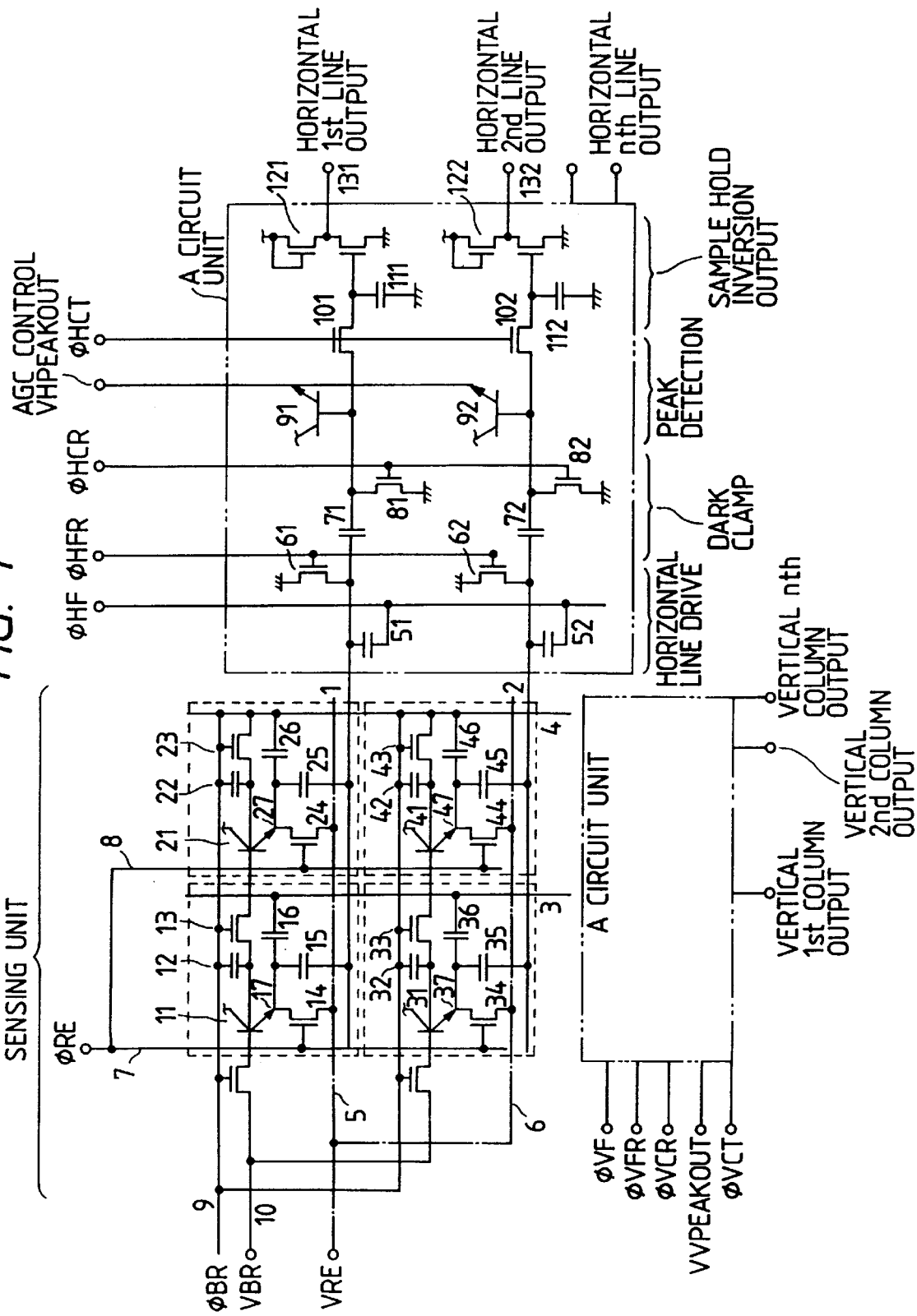
FIG. 1 is a circuit constructional diagram of an image sensor according to an embodiment 1 of the present invention.

FIG. 1 shows an equivalent circuit diagram of the first embodiment of a photosensitive unit and a read-out circuit of a photoelectric converting apparatus of the invention. Although a construction of (2×2) pixels has been shown in the diagram, it will be obviously understood that the number of pixels is not limited to such a value.

Reference numerals 11, 21, 31, and 41 denote npn-type bipolar transistors. A base region of each of the bipolar transistors is used as a photodiode of a photosensitive layer. Holes of electron/hole pairs generated by the light irradiation are accumulated into the base region.

Reference numerals 12, 22, 32, and 42 denote capacitors provided on the base regions. These capacitors control the ON/OFF states of the bipolar transistors.

Reference numerals 13, 23, 33, and 43 denote P-type MOS switches which are used to separate the photoelectric converting cells in the lateral direction and to reset the potentials of photodiodes.

Reference numerals 14, 24, 34, and 44 denote N-type MOS switches to reset emitter potentials. Sources of the MOS switches 14 and 24 are connected to an emitter reset power source line 5. Sources of the MOS switches 34 and 44 are similarly connected to an emitter reset power source line 6.

Reference numerals 15, 16, 25, 26, 35, 36, 45, and 46 denote capacitors which are connected from emitters 17, 27, 37, and 47 of the above MOS switches to floating bus lines 1, 2, 3, and 4, respectively.

The capacitor and PMOS gate provided in the base region of the bipolar which have been described above are connected to a driving line 9 and a pulse $\phi_{BR}$ can be applied to them. In the embodiment, they are commonly connected in all of the pixels. In addition, in case of that each pixel is read out and reset on the unit basis of a pixel or pixel block, the pulses $\phi_{BR}$ and $\phi_{RE}$ should be separated so as to be applied on the unit basis of a pixel or block.

A base reset power source $V_{BR}$ of each bipolar transistor can be applied to bases of all pixels through a P-type diffusion layer 10.

A read-out circuit section will now be described. Only the read-out circuit in the horizontal direction is shown in FIG. 1. Since read-out signals are output simultaneously in the horizontal and vertical directions every row and every column in parallel, a circuit form in the horizontal direction and a circuit form in the vertical direction are similar. Therefore, the circuit in the vertical direction is omitted here.

Reference numerals 51 and 52 denote capacitors for controlling potentials of the horizontal floating bus lines 1 and 2, respectively. A pulse $\phi_{HF}$ for control can be applied to one of the capacitors 51 and 52.

Reference numerals 61 and 62 denote MOS switches for resetting the potentials of the horizontal floating bus lines 1 and 2. A pulse $\phi_{HFR}$ is applied to gates of the above MOS switches.

Reference numerals 71 and 72 denote serial capacitors for clamping the potentials of the horizontal floating bus lines; 81 and 82 indicate switches for resetting which are controlled by a pulse $\phi_{HCR}$; and 91 and 92 npn-type bipolar transistors in which bases are connected to output lines from the serial capacitors 71 and 72 and emitters are commonly connected. A peak signal of the pixels on each horizontal lines is output to a terminal $V_{HPEAKOUT}$.

Reference numerals 101 and 102 denote transfer switches to sample and hold capacitors 111 and 112. These transfer switches can be driven by a pulse $\phi_{HCT}$.

Reference numerals 121 and 122 denote MOS inverting amplifiers and their outputs 131 and 132 are generated therefrom.

Figure 2:
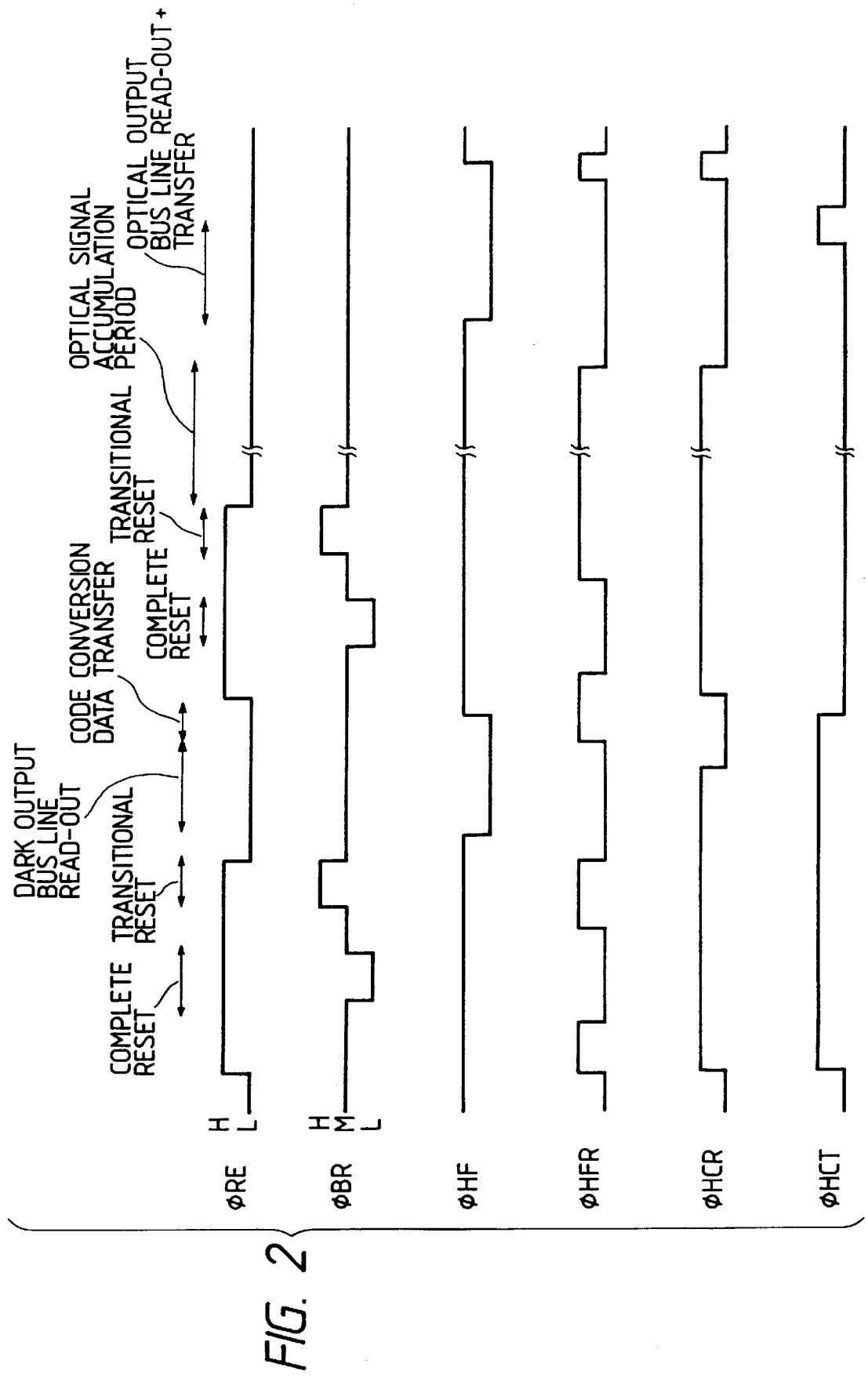
FIG. 2 is a timing chart for explaining the operation of the image sensor according to the embodiment 1.

A driving method will now be described with reference to a timing chart of FIG. 2.

First, a pulse $\phi_{RE}$ is set to the high level and the N-type MOS switches 14, 24, 34, and 44 provided in the emitter portions of the pixel cells are turned on. Thus, the emitter potential is fixed to a power source $V_{RE}$.

At the same time, the potentials of the horizontal floating bus lines 1 and 2 are reset to the ground potential by setting the pulse $\phi_{HFR}$ to the high level, and the potential of the read-out circuit is also reset to the ground potential by setting the pulses $\phi_{HCR}$ and $\phi_{HCT}$ to the high level.

In order to reset the base potential of the bipolar transistor in the pixel section, a potential $V_{BR}$ of about 1 to 2 V is applied to the base of the bipolar transistor. However, when a state in which the emitter is connected to the grounds is held, the bipolar transistors of all pixels are turned on and a large current flows. Therefore, the pulse $\phi_{HFR}$ is once set to the low level, thereby setting the horizontal floating bus lines 1 and 2 to which the emitters are connected into a floating state. After that, the pulse $\phi_{BR}$ is set to the low level from the intermediate level and the P-type MOS switches 13, 23, 33, and 43 of the pixel section are set to ON and the base potential is fixed to the potential $V_{BR}$. In FIG. 1, such a resetting method (complete reset) is executed from one side through the P-type diffusion layer 10. In order to reduce the resetting time, however, it is sufficient to execute the resetting from both sides of the pixel.

After completion of the resetting, the pulse $\phi_{BR}$ is once returned to the intermediate level, the pulse $\phi_{HFR}$ is again set to the high level, and the horizontal floating bus lines are reset to the ground potential. In order to converge the base region to the base potential that is decided by the emitter potential, the pulse $\phi_{BR}$ is again set to the high level. Due to this, the base potential is raised by the capacitors 12, 22, 32, and 42 provided in the pixel sections. A base-emitter bias allows the bipolar transistors of all pixels to operate in the forward direction. For this purpose, by setting the fixed base potential $V_{BR}$ at the time of complete resetting to a desired value, the above operation can be easily accomplished. Such a resetting method is called a transitional reset and, at the start of the reset, although the current flows by the forward bias of the bipolar transistor, the electrons which were reversely implanted from the emitter are recombined with the holes in the base and the base potential suddenly drops. In association with it, a reset current exponentially decreases. By the above reset, a variation in reset potential or the like is reduced and the base potential becomes uniform, so that reset noises upon reading decrease.

Subsequently, in order to set the emitters of the pixel portion into a floating state, the pulse $\phi_{RE}$ is set to the low level, the pulse $\phi_{BR}$ is set to the intermediate level, the pulse $\phi_{HFR}$ is also set to the low level, and the horizontal floating bus lines 1 and 2 are set to the floating state.

Before optical signals are accumulated, a dark output is read out in order to clamp the signal by an output level at the time of the dark state. For this purpose, the pulse $\phi_{HF}$ which has been held at the high level for a period of time so far is set to the low level. Due to this, the horizontal floating bus lines 1 and 2 are swung toward low levels through the capacitors 51 and 52. Further, the emitters 17, 27, 37, and 47 of the bipolar transistors are swung toward low levels through the capacitors 15, 25, 35, and 45. By the above operation, the bipolar transistor is again turned on and the voltage corresponding to the base potential in the dark state is read out to the emitter side. To clarify the voltage relation at this time, the whole capacitance of the horizontal floating bus line 1 is set to $C_{HFL1}$, the capacitance of the capacitor 15 is set to $C_{15}$, the capacitance of the capacitor 25 is set to $C_{25}$, an increased amount of the emitter potential due to the turn-on of the bipolar transistor in the dark state is set to $V_{dark}^{11}$ for the bipolar transistor 11 and is set to $V_{dark}^{21}$, and the capacitance of the capacitor 51 is set to $C_{51}$. In this instance, the voltage of the floating bus line due to the output in the dark state is set to $$\frac{C_{15} V_{dark}^{11}}{C_{HFL1}} + \frac{C_{25} V_{dark}^{21}}{C_{HFL1}} - \frac{C_{51}}{C_{HFL1}} \phi_{HF} \qquad (1)$$

With respect to the horizontal floating bus line 2 as well, the voltage due to the output in the dark state is set to $$\frac{C_{35}V_{dark}^{31}}{C_{HFL2}} + \frac{C_{45}V_{dark}^{41}}{C_{HFL2}} - \frac{C_{52}}{C_{HFL2}} \phi_{HF} \qquad (2)$$

$C_{35}$ and $C_{45}$ denote capacitances of the capacitors 35 and 45; $C_{HFL2}$ a capacitance of the horizontal floating bus line 2; $V_{dark}^{31}$ and $V_{dark}^{41}$ output values on the emitter side of the bipolar transistors 31 and 41 in the dark state; and $C_{52}$ a capacitance of the capacitor 52. In case of the embodiment of the invention, all of $C_{15}$, $C_{25}$, $C_{35}$, and $C_{45}$ are set to the same value, $C_{HFL1}$ and $C_{HFL2}$ are set to the same value, and $C_{51}$ and $C_{52}$ are set to the same value.

Now, assuming that $$C_{HE} \equiv C_{15} = C_{25} = C_{35} = C_{45}$$

$$C_{HC} \equiv C_{51} = C_{52},$$

the following equation is obtained:

$$C_{HFL} \equiv C_{HFL1} = C_{HFL2}$$

The expressions (1) and (2) are respectively simplified as follows.

$$\frac{C_{HE}}{C_{HFL}} (V_{dark}^{11} + V_{dark}^{21}) - \frac{C_{HC}}{C_{HFL}} \phi_{HF} \qquad (1')$$

$$\frac{C_{HE}}{C_{HFL}} (V_{dark}^{31} + V_{dark}^{41}) - \frac{C_{HC}}{C_{HFL}} \phi_{HF} \qquad (2')$$

When the output at the dark-state level is read out, the output lines on the right side of the serial capacitors 71 and 72 are fixed to the ground potential by the MOS switches 81 and 82. However, after the reading operation was sufficiently settled and the voltage change was eliminated, the pulse $\phi_{HCR}$ is set to the low level and the lines on the right side of the serial capacitors are respectively set to the floating state. After that, the pulse $\phi_{HFR}$ is set to the high level and the horizontal floating bus lines 1 and 2 are reset to the ground potential. In this instance, since the voltages are changed to the low values shown by the above expressions (1)' and (2)', the voltages on the right side of the serial capacitors 71 and 72 are set to the following values.

$$-\frac{K}{C_{HFL}} [C_{HE}(V_{dark}^{11} + V_{dark}^{21}) - C_{HC}\phi_{HF}] \qquad (3)$$

$$-\frac{K}{C_{HFL}} [C_{HE}(V_{dark}^{31} + V_{dark}^{41}) - C_{HC}\phi_{HF}] \qquad (4)$$

where, K is a constant which is determined from the capacitances of the serial capacitors, sample hold capacitors, and the like.

The pulse $\phi_{HCT}$ is subsequently set to the low level and the voltages of the above expressions (3) and (4) are held to $C_{111}$ and $C_{112}$ of the sample hold capacitors 111 and 112. After the pulse $\phi_{HCT}$ was set to the low level, the pulse $\phi_{HF}$ is set to the high level.

Before the optical signals are accumulated, the potentials of the emitters and bases of the bipolar transistors and the potentials of the output lines on the right side of the serial capacitors 71 and 72 are reset by the operations similar to those in case of reading out the outputs in the dark state.

After the above resetting operations were finished, the optical signal accumulating operation is started. Since the pulse $\phi_{BR}$ is set to the intermediate level from the high level, the base potentials of the bipolar transistors are swung to values on the negative side. Due to this, since the bipolar transistors are perfectly held in the OFF state for the accumulation period of time, no voltage change occurs in both of the emitters in the floating state and the horizontal floating bus lines. Therefore, for the accumulation period of time, the pulses $\phi_{RE}$ and $\phi_{HFR}$ are set to the high level and it is possible to set to either one of the state in which they are fixed to the ground voltage and the state in which they are not fixed to the ground voltage. At the timings shown in FIG. 2, the emitter ends are set into the floating state and the horizontal floating bus lines are fixed to the ground potential.

After completion of the optical signal accumulation period of time, the pulses $\phi_{HFR}$ and $\phi_{HCR}$ to set the horizontal floating bus lines and the output lines on the right side of the serial capacitors into the floating state are set to the low level, respectively.

After that, the pulse $\phi_{HF}$ is set to a value on the lower side. Due to this, the voltages of the horizontal floating lines and the emitter edges are reduced to the values on the lower side. The base-emitter bias is applied to the bipolar transistors in the forward direction and the optical signal is read out at each emitter end. The voltages at the emitter ends are set to optical signal components $V_p^{11}$, $V_p^{21}$, $V_p^{31}$, and $V_p^{41}$ which were irradiated to the photodiodes formed in the base regions of the bipolar transistors and to the bias components $V_{dark}^{11}$, $V_{dark}^{21}$, $V_{dark}^{31}$, and $V_{dark}^{41}$ of the outputs in the dark state. Therefore, the potentials of the horizontal floating lines are as shown by the following expressions (5) and (6).

$$\frac{1}{C_{HFL}} [C_{HE}(V_p^{11} + V_{dark}^{11} + V_p^{21} + V_{dark}^{21}) - C_{HC}\phi_{HF}] \qquad (5)$$

$$\frac{1}{C_{HFL}} [C_{HE}(V_p^{31} + V_{dark}^{31} + V_p^{41} + V_{dark}^{41}) - C_{HC}\phi_{HF}] \qquad (6)$$

When the pulse $\phi_{HFR}$ is subsequently set to the high level, the voltage change amounts of the expressions (5) and (6) are read out to the sampling transistors, so that they are added to the voltages of the above expressions (3) and (4) and the voltages as shown by the following expressions (7) and (8) are consequently derived.

$$\frac{K}{C_{HFL}} [C_{HE}(V_p^{11} + V_{dark}^{11} + V_p^{21} + V_{dark}^{21}) - C_{HC}\phi_{HF}] - \qquad (7)$$

$$\frac{K}{C_{HFL}} [C_{HE}(V_{dark}^{11} + V_{dark}^{21}) - C_{HC}\phi_{HF}]$$

$$\frac{K}{C_{HFL}} [C_{HE}(V_p^{31} + V_{dark}^{31} + V_p^{41} + V_{dark}^{41}) - C_{HC}\phi_{HF}] - \qquad (8)$$

$$\frac{K}{C_{HFL}} [C_{HE}(V_{dark}^{31} + V_{dark}^{41}) - C_{HC}\phi_{HF}]$$

Thus, the horizontal addition outputs are read out in parallel as shown by the following expressions (9) and (10).

$$\frac{K C_{HE}}{C_{HFL}} (V_p^{11} + V_p^{21}) \qquad (9)$$

$$\frac{K C_{HE}}{C_{HFL}} (V_p^{31} + V_p^{41}) \qquad (10)$$

Since operations similar to those mentioned above are also executed in the vertical direction, addition outputs are read out in parallel in the vertical direction.

Figure 3A:
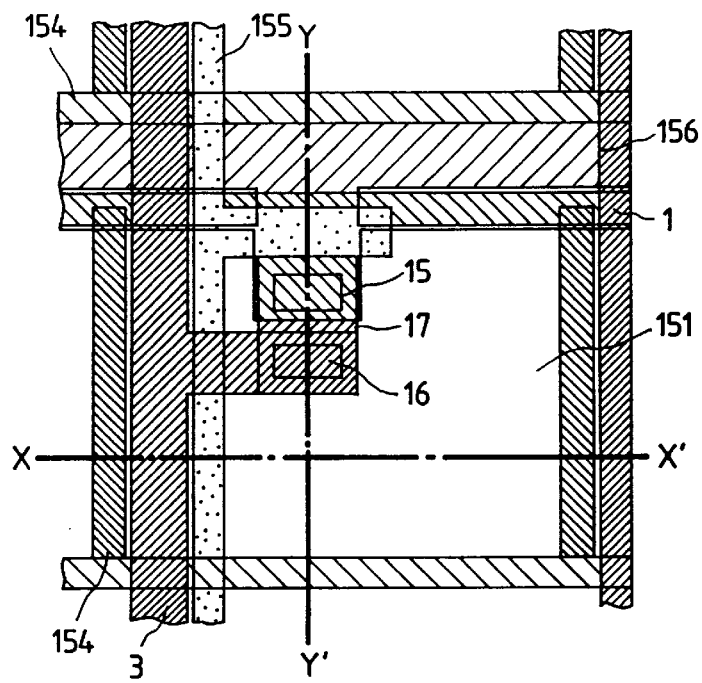
FIGS. 3A to 3C are a plan view and cross sectional views of a sensor unit cell according to the embodiment 1.
Figure 3B:
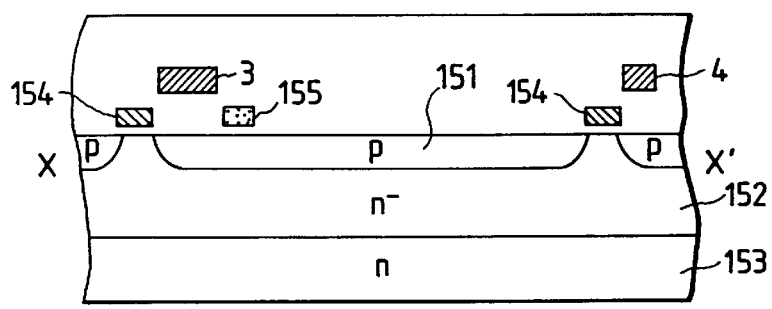
Figure 3C:
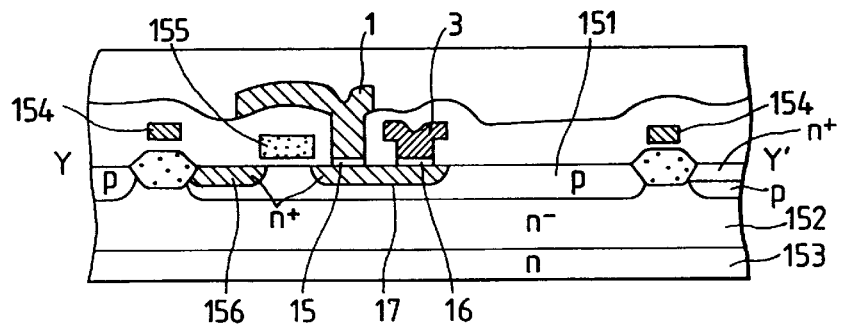

A structure of the sensor section of the invention will now be described with reference to FIGS. 3A to 3C. FIG. 3A is a plan view of a unit cell of the bipolar transistor 11 section in FIG. 1. FIG. 3B is a cross sectional view taken along the line X–X' in FIG. 3A. FIG. 3C is a cross sectional view taken along the line Y–Y' in FIG. 3A. In the diagrams, the same portions as those in FIG. 1 are designated by the same reference numerals.

Reference numeral 151 denotes a base layer of the bipolar transistor 11; 17 the emitter comprising an n+ diffusion layer;

152 an n⁻ diffusion layer; and 153 a substrate forming a collector layer of the bipolar transistor.

In addition to the above construction, it will be obviously understood that an n⁻ layer can be formed on a P-type substrate through an n⁺ buried layer.

Reference numeral 154 denotes a gate electrode for resetting and driving the base layer and a wiring connected to the gate electrodes. As will be understood from FIG. 3B, the base layer of each cell is separated by the gate electrodes 154. The pulse $\phi_{BR}$ shown in FIG. 1 is applied to those gate electrodes. When the pulse $\phi_{BR}$ is at the low level, the P-type MOS transistor is turned on and the base potential is reset to $V_{BR}$.

When the pulse $\phi_{BR}$ at the high level is applied, a capacitor which is formed by the overlap portion of the gate electrode 154 and the base layer also functions as a capacitor 12 shown in FIG. 1 for raising the base potential.

Reference numeral 155 denotes a second gate electrode and a wiring connected thereto. As will be understood from FIG. 3C, the gate electrode 155 is provided to control the ON/OFF operations of the power source line $V_{RE}$ comprising the n⁺ diffusion layer and the emitter 17.

The horizontal floating bus line 1 and the vertical floating bus line 3 are connected to the emitter 17 through insulating layers as shown at 15 and 16 in FIG. 3C.

As described above, the image sensor of the invention can be realized by a simple construction by using two kinds of gate wiring materials, one kind of diffusion layer, power source line, and two kinds of wiring layers (for instance, Al1 and Al2 for the horizontal and vertical floating bus lines). In the embodiment, the capacitors 15, 16, 25, 26, 35, 36, 45, and 46 of the pixel section have been set to the same values. However, it will be obviously understood that by changing those values, a weight of output of each pixel can be changed.

Figure 4:
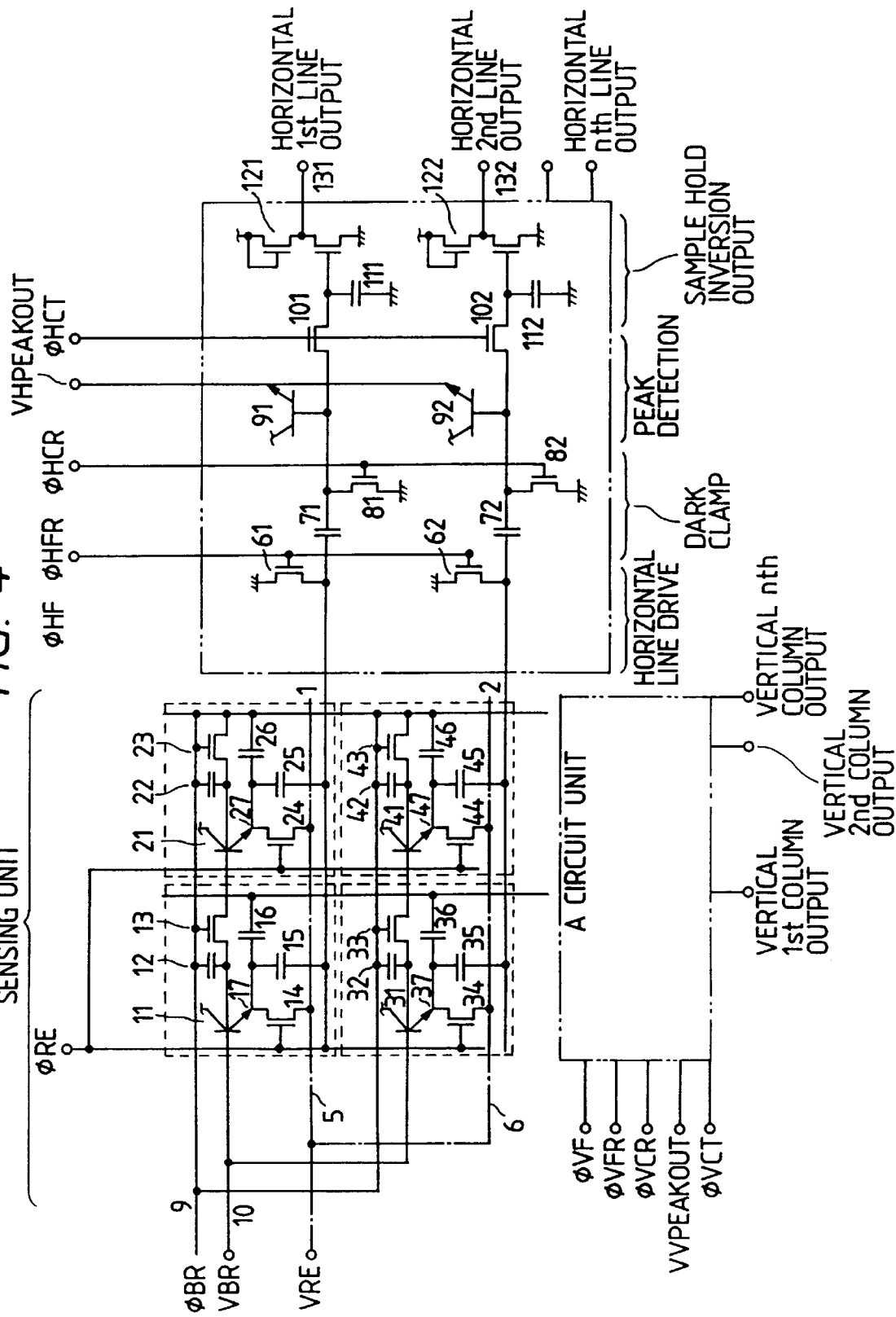
FIG. 4 is a circuit constructional diagram of an image sensor according to an embodiment 2 of the invention.
Figure 5:
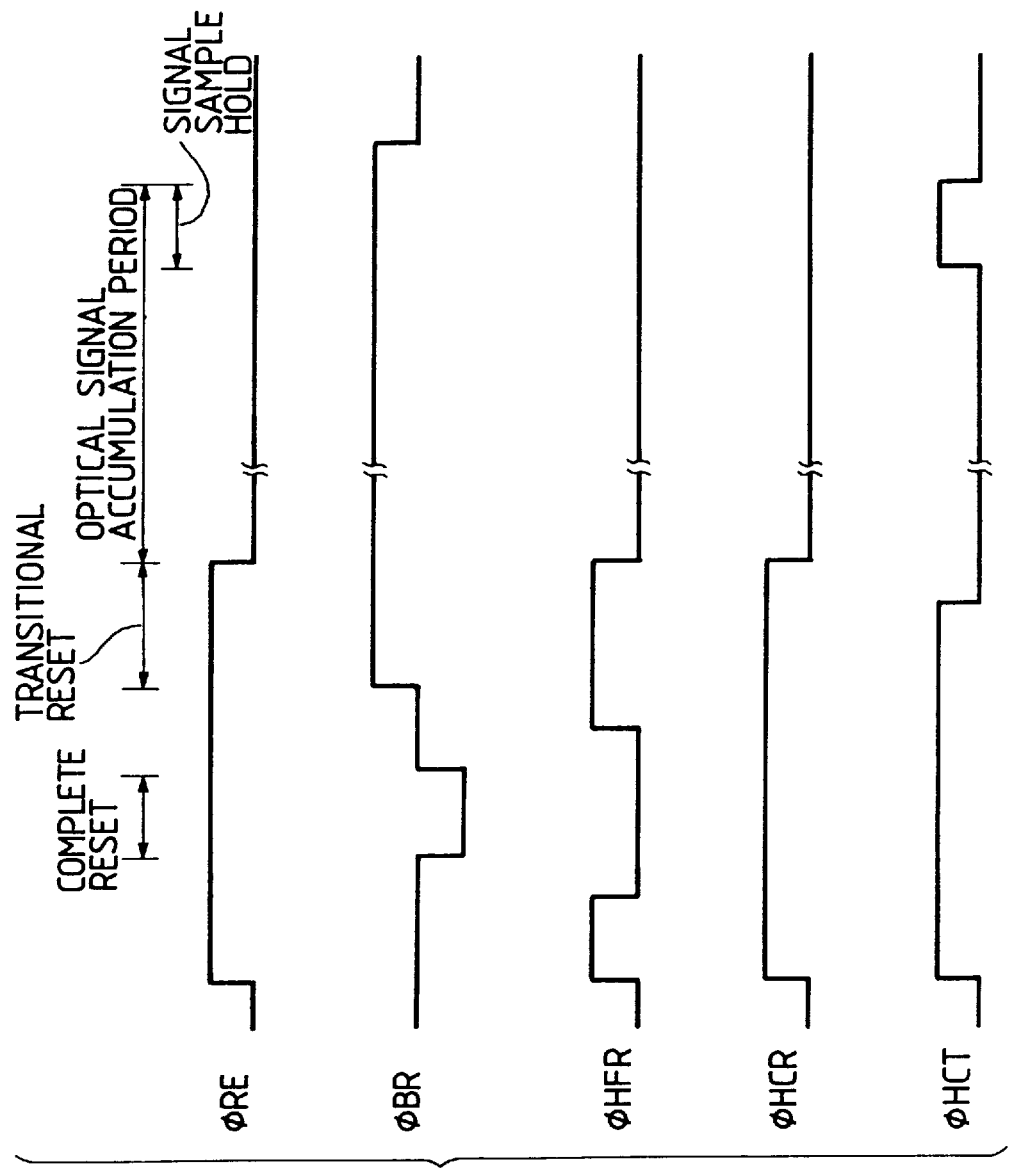
FIG. 5 is a timing chart for explaining the operation of the image sensor according to the embodiment 2.

FIG. 4 shows an equivalent circuit diagram of the second embodiment. FIG. 5 shows a driving timing chart. In the second embodiment, the same portions as those in the first embodiment are designated by the same reference numerals and their descriptions are omitted.

The second embodiment differs from the first embodiment with respect to a point that the resetting and reading operations are executed by controlling the base potentials by the capacitors 12, 22, 32, and 42 provided in each cell and that the potentials of the horizontal and vertical floating bus lines are not controlled. Therefore, the capacitors 51 and 52 and the pulse $\phi_{HF}$ shown in FIG. 1 and the capacitors and pulse $\phi_{VF}$ for the vertical line corresponding to them are also unnecessary.

An operating method will now be described with reference to a timing chart shown in FIG. 5. In a manner similar to the first embodiment, the bases, emitters, horizontal floating lines, and output lines on the right side of the serial capacitors 71 and 72 are reset. At a time point of the end of the transitional reset, the MOS transistors for resetting the emitters are in the ON state, the horizontal floating bus lines are fixed to the ground potential, and the output lines on the right side of the serial capacitors are also fixed to the ground potential. By sufficiently executing the transitional resetting operation, the base potential decreases and a state in which the current hardly flows into the bipolar transistor is obtained. After such a state occurred, at the above terminals, when the pulses $\phi_{RE}$, $\phi_{HFR}$, and $\phi_{HCR}$ are set to the low level, the addition output of each pixel of the signal corresponding to the base potential which was raised by the irradiated light appears on the horizontal floating lines.

Since the voltage fluctuation which is caused when the pulses $\phi_{RE}$, $\phi_{HFR}$, and $\phi_{HCR}$ are set to the low level is not propagated to the sample and hold capacitors, it is desirable to set the pulse $\phi_{HCT}$ to the low level just before the end of the transitional reset.

As mentioned above, the output corresponding to the addition signal of each pixel appears on the horizontal floating bus lines. The potentials of the output lines on the right side of the serial capacitors also rise through the serial capacitors 71 and 72.

In the operation of the invention, an increase in output can be monitored during the optical signal accumulation. Therefore, as shown at 91 and 92, by connecting the base layers of the npn-type bipolar transistors to the output lines and by commonly connecting the emitters, the peak value of the signal which was output in the horizontal direction can be detected. Due to this, by properly selecting the accumulation time, the output levels of the image data when the signal is processed later can be equalized.

It is sufficient that, at a time point of the end of a desired accumulation time, the pulse $\phi_{HCT}$ is turned on and the data is fetched into the sample hold capacitors. The data is read out in parallel from the sample hold capacitors through the amplifier. Although the data has been generated through the inverting amplifiers of the MOS transistors in the first and second embodiments, the data such as a character or the like is converted in a manner such that an output level of a character region is contrarily set to a high level due to this and the image process at the post stage becomes easy.

Figure 6:
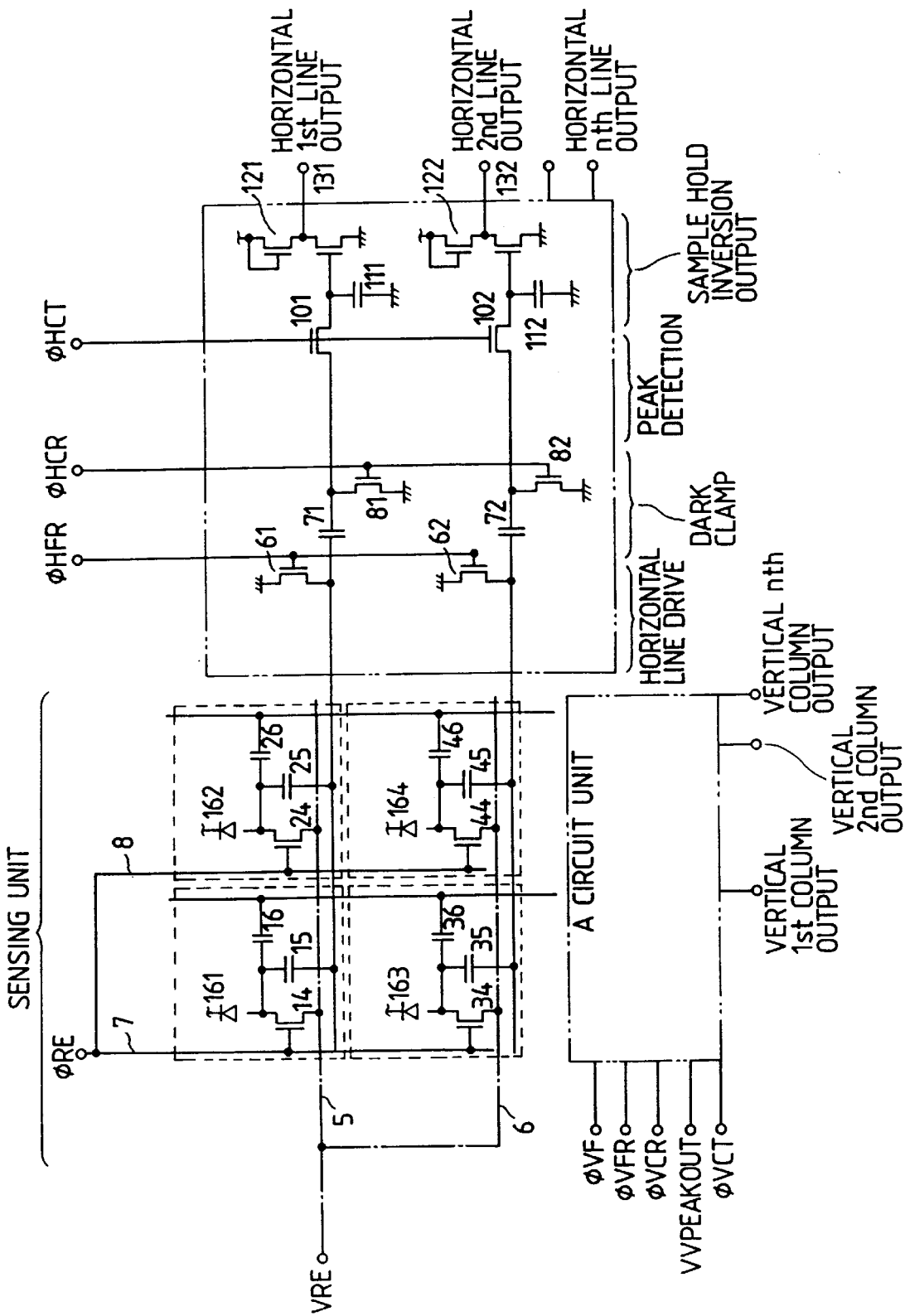
FIG. 6 is a circuit constructional diagram of an image sensor according to an embodiment 3 of the invention.

The third embodiment of the invention will now be described with reference to FIG. 6. In FIG. 6, the same portions as those shown in the foregoing embodiment are designated by the same reference numerals and their descriptions are omitted. The third embodiment differs from the foregoing embodiment with respect to a point that the bipolar devices are eliminated and output signals of photodiodes 161, 162, 163, and 164 are directly supplied to the horizontal and vertical floating bus lines through the capacitors 15, 16, 25, 26, 27, and 28.

As will be also understood from FIG. 6, since a construction of the third embodiment is simple, a numerical aperture of a photosensitive unit is large. If parasitic capacitances existing in the horizontal and vertical floating bus lines are suppressed to small values and the capacitances of the capacitors 15, 16, 25, 26, 35, 36, 45, and 46 can be reduced, an output by the light irradiation of the photodiode region is also obtained. Therefore, in case of an image in which an enough large light amount is obtained, the construction of the embodiment 3 is effective.

Figure 7:
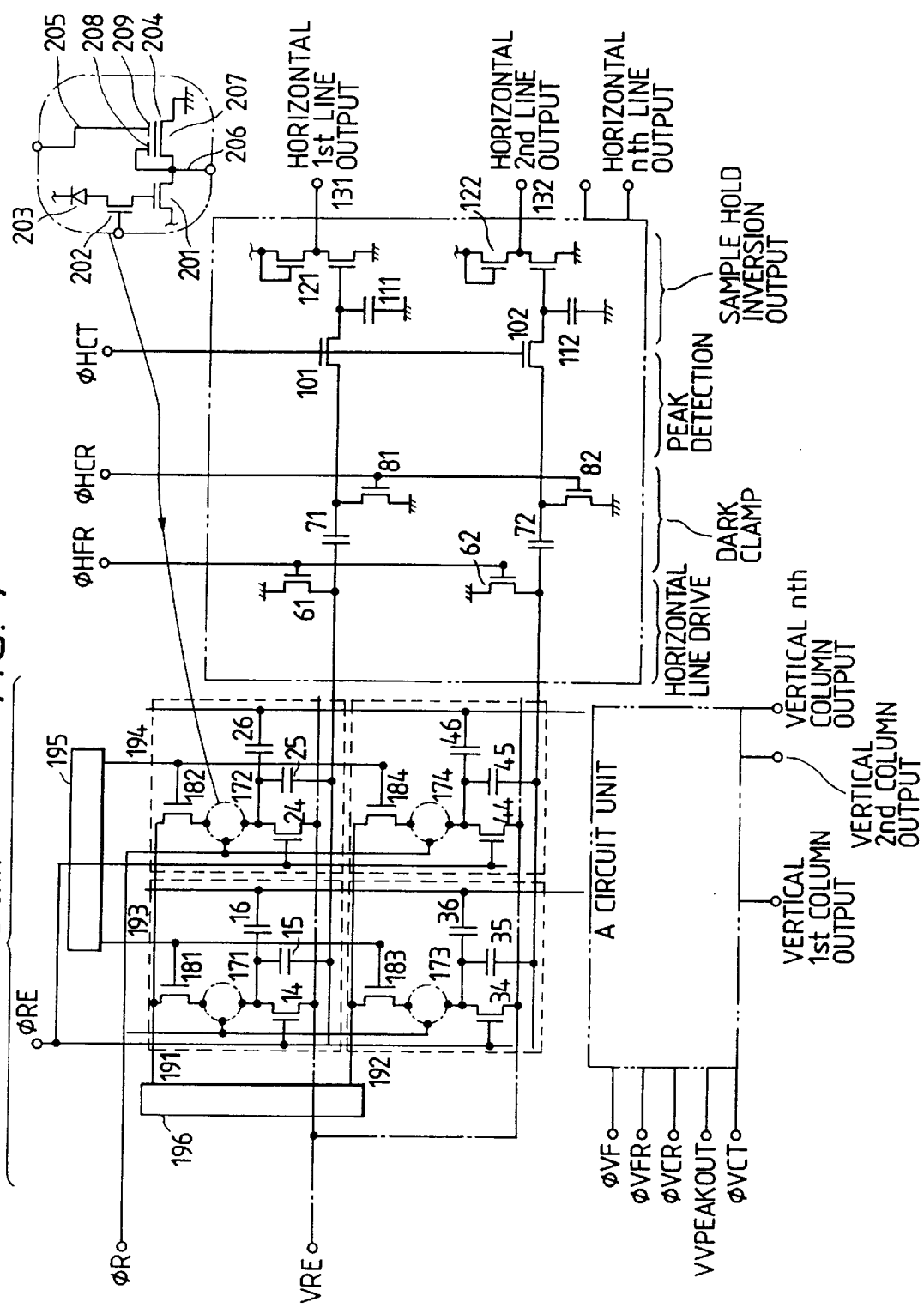
FIG. 7 is a circuit constructional diagram of an image sensor according to an embodiment 4 of the invention.

The fourth embodiment of the invention will now be described with reference to FIG. 7. In the fourth embodiment, a sensitivity of a photoelectric converting unit can be varied every pixel and product sum arithmetic operations can be executed in a lump in a photoelectric converting region.

A construction of the photosensitive section will be first described. Reference numeral 203 denotes a photodiode. Carriers which were photoelectrically converted in a photodiode region are transferred to the gate electrode of an MOS transistor 201 through a transfer gate 202.

Not only an ordinary MOSFET but also a JFET or the like can be used as a transistor 201. A current flowing in the transistor unit 201 is modulated by the transfer carriers.

On the other hand, in order to variably change a gain of an amplifier which is formed by transistors 201 and 207, as a gate of the transistor 207, one layer of a floating gate 204 is sandwiched and separated gates 208 and 209 of the second layer are provided over the floating gate 204. The gate 208 is connected to an output terminal 206. The gate 209 is connected to a control terminal 205.

A voltage of the floating gate 204 rises or drops by a pulse which is input to the control terminal 205, so that an effective resistance value of the transistor 207 changes. Due to this, an output in which a sensitivity of each cell is taken out from the output terminal.

It is sufficient to input the pulse to each cell as follows. As shown in FIG. 7, a transfer pulse from the photodiode to the gate of the amplifier is realized by a pulse $\phi_R$. Pulses for adjusting the sensitivities of the devices are sent from a power source 196 through lines 191 and 192. It is sufficient to provide switches for selection 181, 182, 183, and 184 and to supply their selection pulses from a pulse generator 195 through wirings 193 and 194.

As described above, the sensitivity can be changed every cell and each output is added by the horizontal and vertical floating bus lines, so that the product sum arithmetic operations can be executed in a lump. A real time Fourier transformation or the like of the pixels can be performed.

The fifth embodiment of the invention will now be described with reference to FIG. 8. The fifth embodiment relates to an example of a case where each of the horizontal and vertical floating bus lines is divided and signals are separately generated from the right side, left side, upper side, and lower side.

Figure 8:
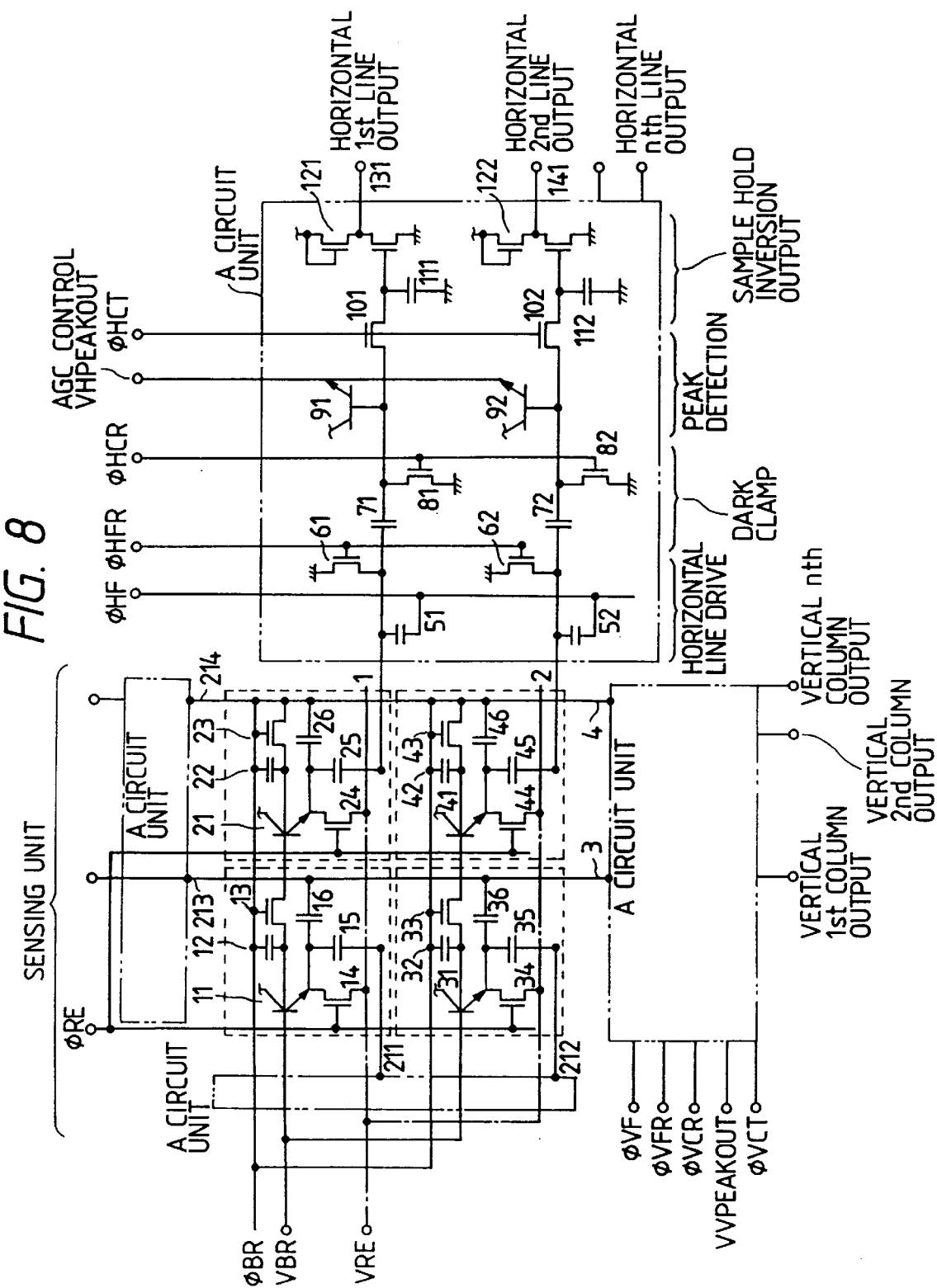
FIG. 8 is a circuit constructional diagram of an image sensor according to an embodiment 5 of the invention.

In FIG. 8, the horizontal floating bus lines 1 and 2 extend to the right and horizontal floating bus lines 211 and 212 extend to the left. The vertical floating bus lines 3 and 4 extend to the lower side and vertical floating bus lines 213 and 214 extend to the upper side. Similar read-out circuits are arranged on those floating bus lines, respectively. Although FIG. 8 relates to the example in which four cells were divided, the number of cells is not limited to four but it will be obviously understood that the numbers of upper, lower, left, and right lines are not always equal.

Several embodiments of an image processing unit to process the output signals from the embodiments of the invention mentioned above will now be described.

Figure 9B:
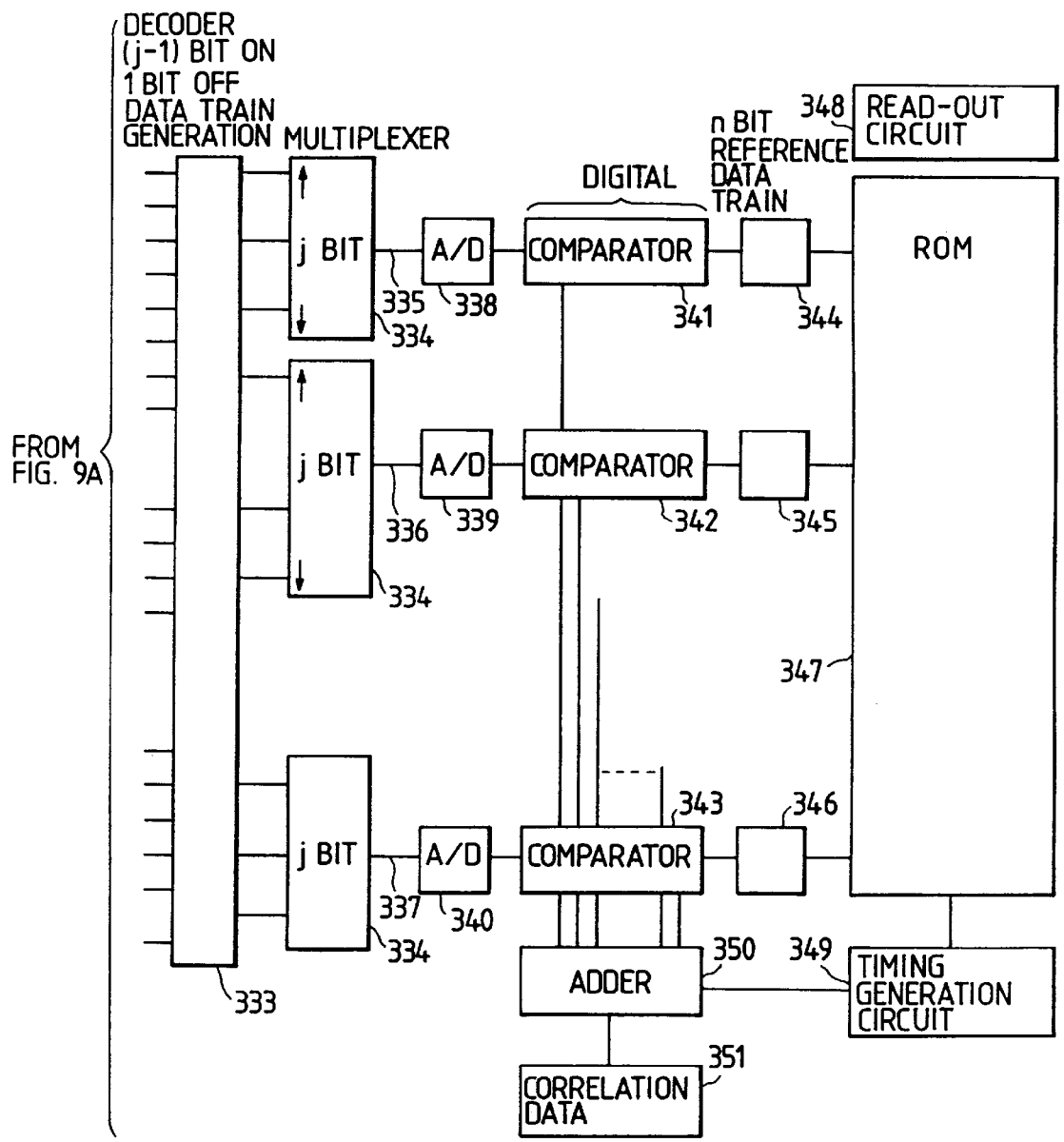
FIG. 9 is comprised of FIGS. 9A and 9B showing diagrams of an embodiment of an image processing section of the invention.

The image processing unit of the invention will now be described with reference to FIGS. 9A and 9B. Since the horizontal and vertical outputs are read out in the same format, only the horizontal output will now be described.

Reference numerals 301, 302, and 303 denote first, second, and n-th horizontal line outputs. Each of those outputs is branched into two outputs. One of them is supplied to shift circuits 307, 308, and 309 and the other is supplied to comparators 304, 305, and 306.

Each comparator judges whether the output signal is equal to or higher than a reference potential $V_{REF}$ shown at 310 or not in order to detect the region of the image obtained by the photoelectric conversion unit. An output of the comparator is supplied to a counter circuit 311. The number of bits until the image starts and a length of image are calculated by the counter circuit.

It is now assumed that the number of bits at which the image data starts is set to (i) and the length of image is set to (j) in the counter circuit. The horizontal line outputs 301, 302, and 303 are simultaneously shifted upward by (i−1) bits, thereby aligning the heads of the images. It is desirable to use a parallel type in which transmission gates are combined as a shift circuit.

Outputs of the shift circuits are transmitted through amplifiers 312, 313, and 314. The first line data of the head of the image is written into capacitors 315, 316, and 317. The next line data is written into capacitors 318 and 319. The line data of the last line or the line data having no image data is written into capacitors 320, 321, . . . , and 322.

The number of those capacitors is set to $n^2$. Those capacitors are arranged so that they can be separated or connected by MOS switches 323 to 332. The number of gates of the MOS switches is set to $(n^2-1)$ since the MOS switches are arranged among the $n^2$ capacitors. However, there are generated pulses such that when it is now assumed that a voltage at which the MOS gate is turned on from the upper side is set to $V_{ON}$ and a voltage at which it is turned off is set to $V_{OFF}$, after (j−1) signals of $V_{ON}$ continued, $V_{OFF}$ is generated and, subsequently, after (i−1) signals of $V_{ON}$ continued, $V_{OFF}$ is generated. Due to this, the image data is mixed every (j) bits. Therefore, n-bit outputs 335, 336, and 337 are obtained through a multiplexer 334 to select the data at a period of (j) bits.

By executing the processes described above, even an image of an arbitrary size existing at an arbitrary position in the photoelectric converting region can be accurately compared with reference data held in the memory and a pattern recognition precision is raised.

Reference numerals 338, 339, and 340 denote A/D converters; 341, 342, and 343 denote digital comparators; 344, 345, and 346 n-bit reference data trains which were read out from an ROM 347; 348 a data read-out circuit to read out the data from the ROM 347; 349 a timing generation circuit; 350 an adder; and 351 a correlation data processing circuit.

The reference data in the ROM is first read out in the data trains 344, 345, and 346 and differential arithmetic operations between those data trains and the image signal received by the light irradiation are executed in parallel by the digital comparators. The image is recognized when the sum of the absolute values of the differential outputs between the data of the pixels and the reference data is minimum. Therefore, the digital comparators 341, 342, and 343 send the data as code data to the adder 350. The result of addition is stored into the correlation data circuit 351. The read-out circuit 348 is activated by the timing generation circuit 349. A comparison arithmetic operation with the next reference data is executed. Each data is stored into the correlation data processing circuit 351. The data of the largest correlation, namely, the data in which the addition result is minimum is selected from the results of a plurality of arithmetic operations by the correlation data circuit and the result is generated.

As described above, the (n) line data are accurately converted into the lengths of reference data stored in the ROM and the comparing arithmetic operations can be executed in parallel, so that a pattern recognition of a high speed and a high precision can be realized.

Figures 10, 10A:
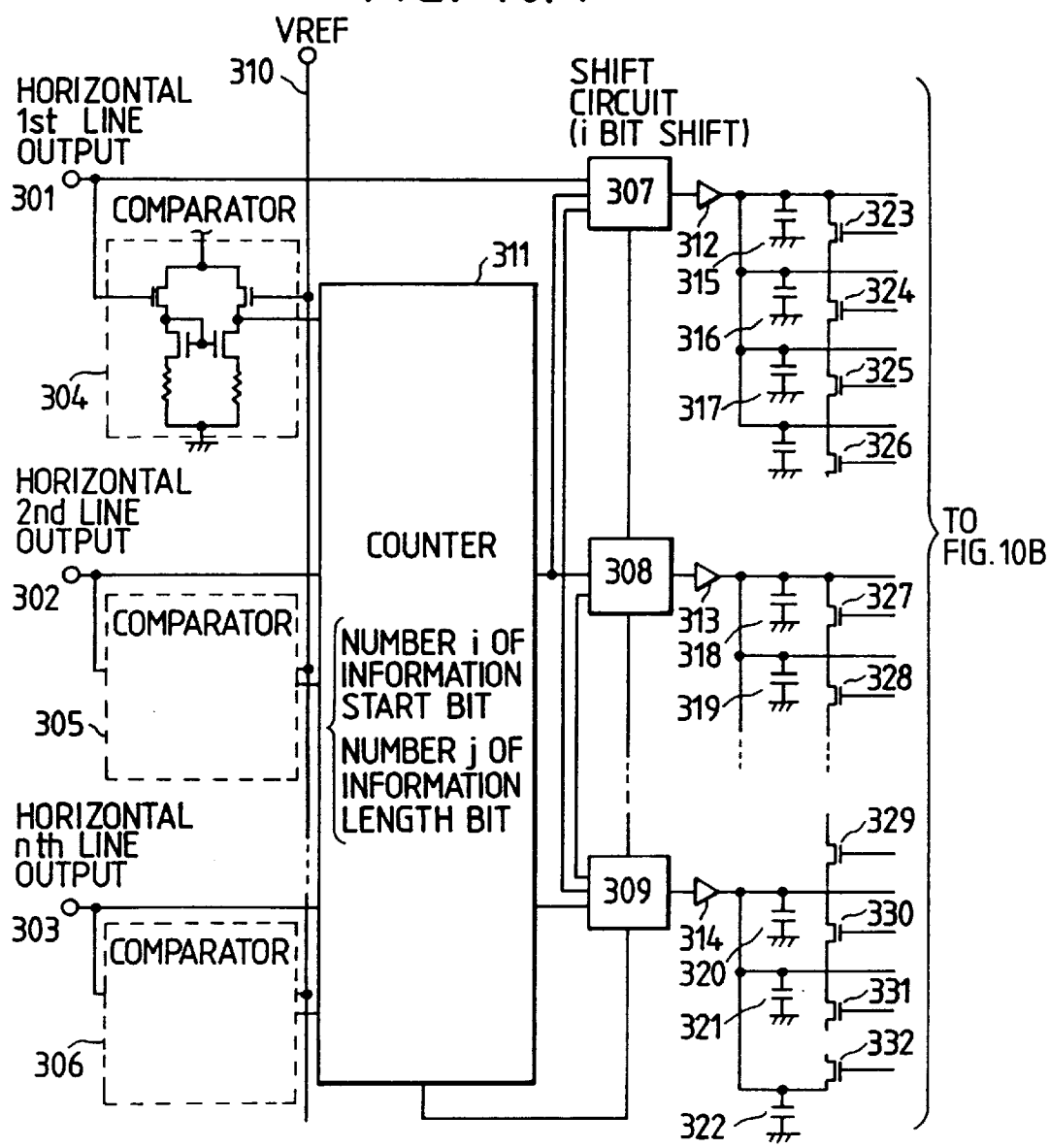
FIG. 10 is comprised of FIGS. 10A and 10B showing diagrams of another embodiment of an image processing section of the invention.
Figure 10B:
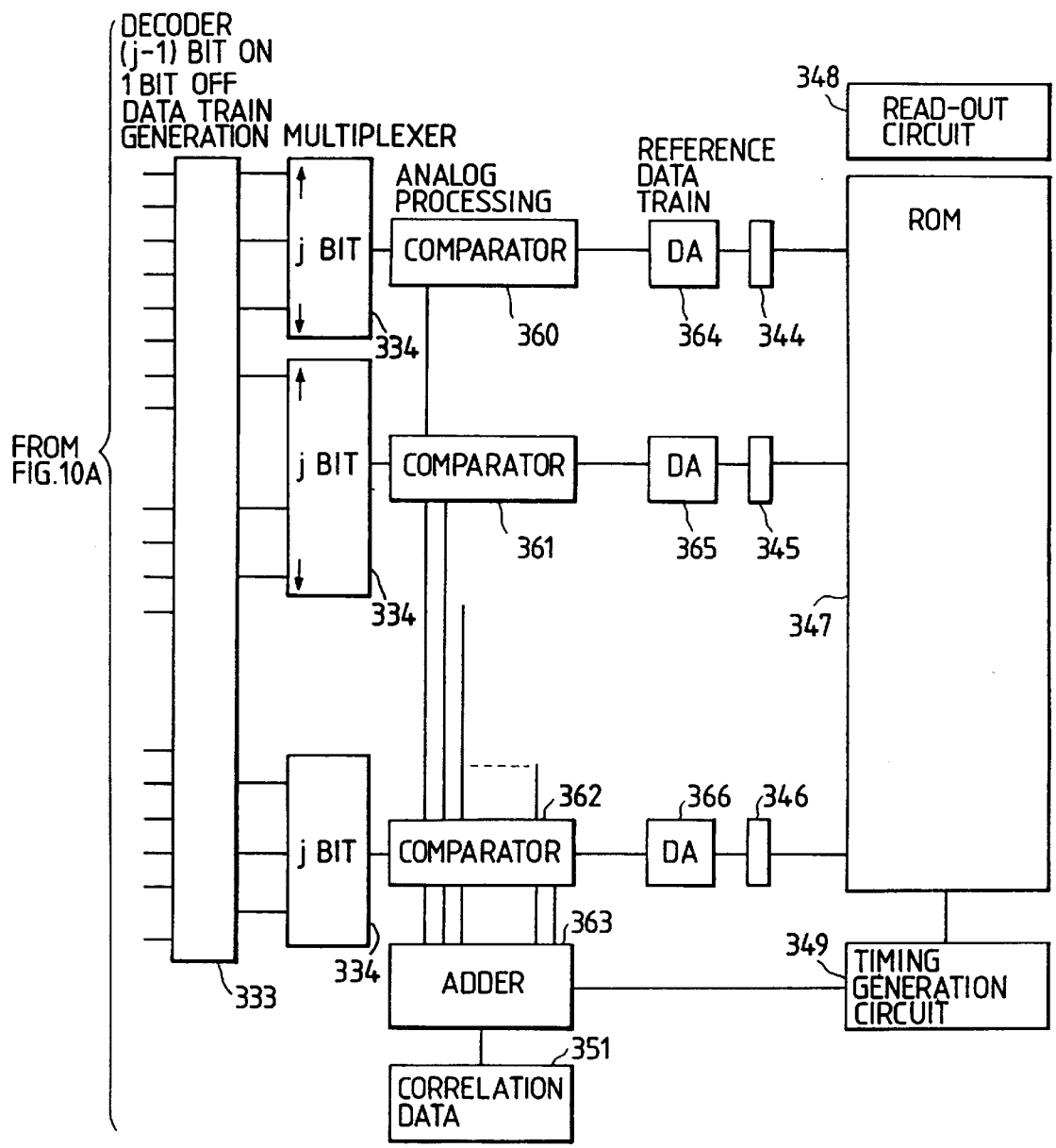

The second embodiment of the image processing unit of the invention will now be described with reference to FIGS. 10A and 10B. In the diagram, the same portions as those in FIGS. 9A and 9B are designated by the same reference numerals and their descriptions are omitted. The embodiment 2 differs from the above embodiment 1 with respect to a point that the comparing arithmetic operations are executed at analog information levels.

Therefore, the reference data trains 344, 345, and 346 from the ROM are converted into the analog information by D/A converters and are arithmetically operated together with the output data of the multiplexer by analog comparators 360, 361, and 362. The data of the largest correlation is generated by the correlation data circuit from the data added by an adder 363.

There is an advantage such that a circuit scale is small because the analog arithmetic operations are executed.

Figures 11, 11A:
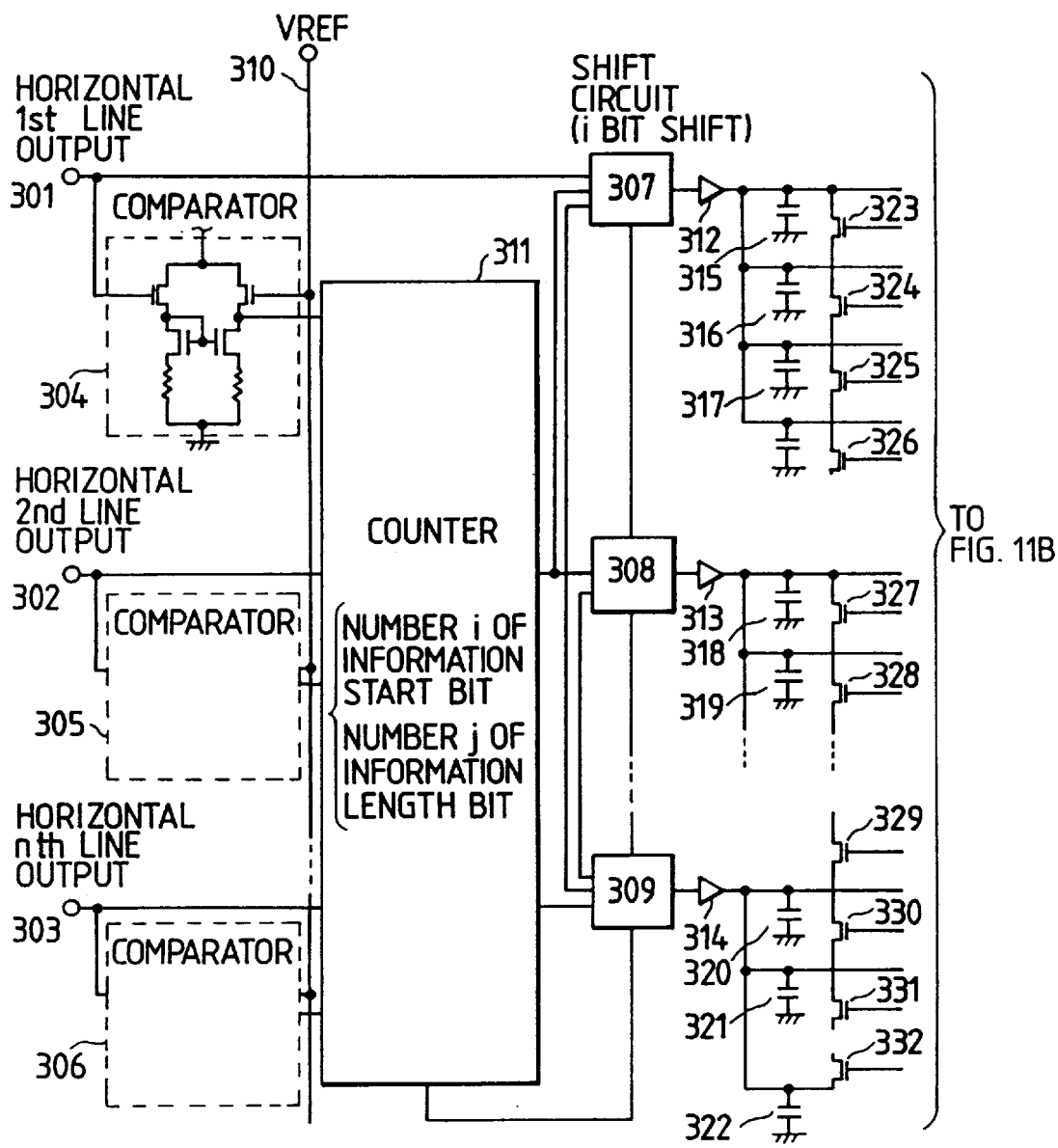
FIG. 11 is comprised of FIGS. 11A and 11B showing diagrams of still another embodiment of an image processing section of the invention.
Figure 11B:
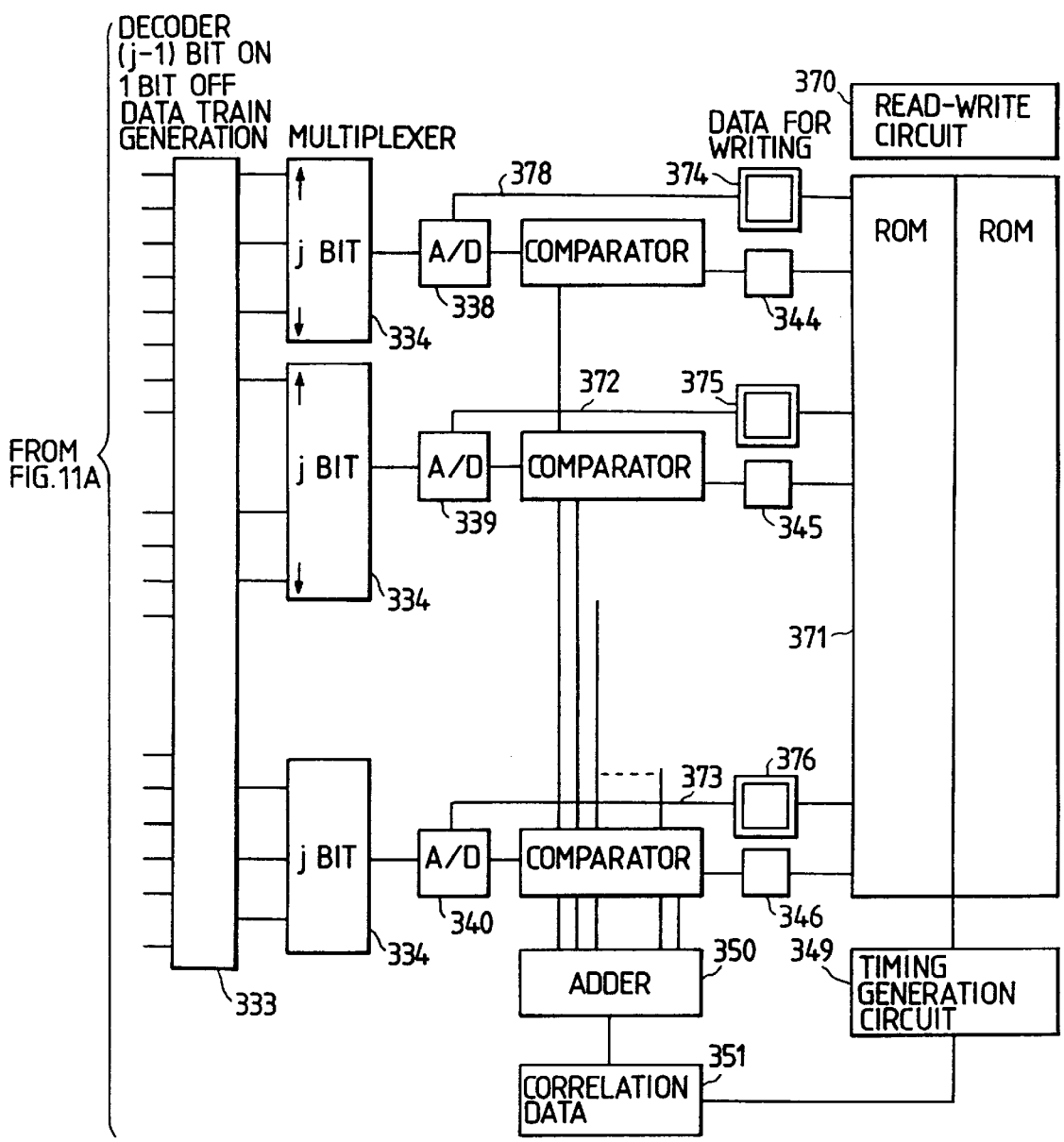

The third embodiment of the image processing unit of the invention will now be described with reference to FIGS. 11A and 11B. In the third embodiment, in addition to the ROM, an RAM is also provided in a memory unit 371 and, after the data was processed by the correlation data circuit, in the case where the correlation data which reaches a reference level doesn't exist, the results of the A/D conversion of the image are written into data input terminals 374, 375, and 376 for writing through wirings 378, 372, and 373. Thus, the data is written into the RAM by a write/read-out circuit 370. With the above construction, a pattern recognizing apparatus having a learning function can be realized.

The fourth embodiment of the image processing unit of the invention will now be described with reference to FIGS. 12A and 12B.

Reference numeral 380 denotes a scanning circuit represented by a shift register. A correlation between the analog output of the multiplexer 334 and the D/A converted analog data from the ROM is obtained every bit by a comparator 381. An output of the comparator 381 is successively added by an adder 382 synchronously with the timing of the shift register 380. The addition result is sent to a correlation data circuit 383.

With the construction of the embodiment 4, the serial processes are executed and although a processing speed deteriorates than the embodiment 3, a circuit scale is small and such an embodiment is suitable for arithmetic operations of a large number of pixels.

Figure 13:
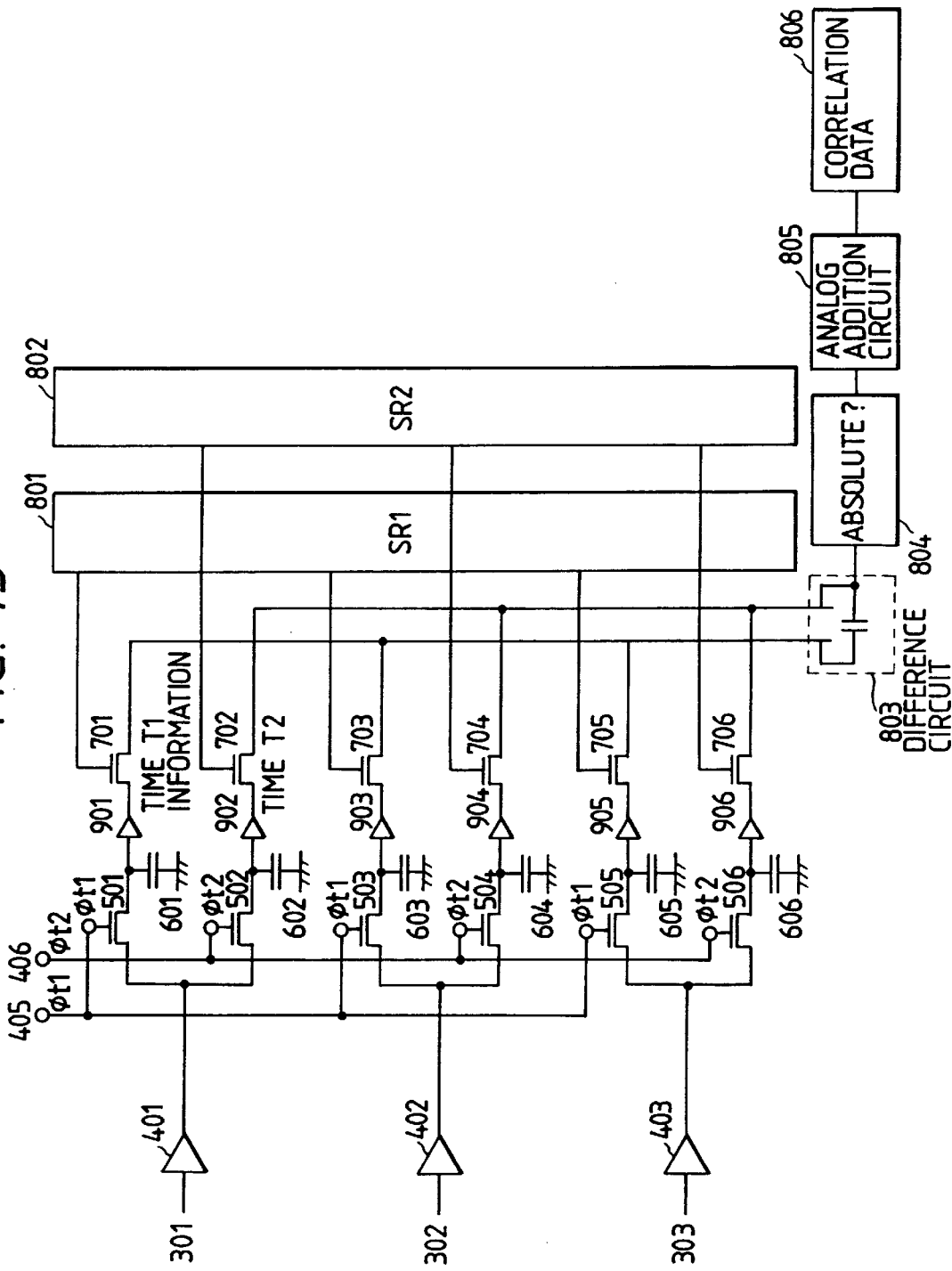
FIG. 13 is a diagram showing further another embodiment of an image processing section of the invention.

The fifth embodiment of the image processing unit of the invention will now be described with reference to FIG. 13. Although the embodiments 1 to 4 of the processing unit have the circuit construction for pattern recognition, the embodiment 5 relates to a processing circuit for detection of a movement.

The horizontal output data 301, 302, and 303 are transmitted through buffer amplifiers 401, 402, and 403. The data at time t1 is written into capacitors 601, 603, and 605 by setting a pulse $\phi_{t1}$ 405 to the high level and by turning on MOS switches 501, 503, and 505, respectively.

Subsequently, data at time t2 is input from 301, 302, and 303 and is again transmitted through the buffer amplifiers 401, 402, and 403 and is written into capacitors 602, 604, and 606 by setting a pulse $\phi_{t2}$ to the high level and by turning on MOS switches 502, 504, and 506, respectively.

To obtain the correlation data at times t1 and t2, the values written in the capacitors are amplified by buffer amplifiers 901 to 906 and are read out to a difference circuit 803. The absolute value of the difference result is obtained by an absolute value circuit 804. After that, each line difference data is added by an analog addition circuit 805 and the addition result is stored into correlation data 806.

Scan timings 801 and 802 are shifted by one bit by one in one direction or the other direction of the time base, and the similar reading operation is executed.

When a bit deviation amount of the largest correlation is obtained by the above operations, it is set into a movement amount of an object in the y direction. By also applying a similar process to the x direction, a movement amount in the x direction is derived.

A method whereby a movement amount of an object is calculated by the video image signal from the image sensor has already been executed. However, when the video image signal is used, since a scan period of the video image has already been decided, for instance, in case of the NTSC system, one field is set in 1/60 second. Therefore, a detection sensitivity regarding a movement which is faster than such a speed deteriorates.

In the construction of the embodiment, since the outputs are simultaneously generated in the x and y directions, a movement detection of extremely high speed and high precision can be realized. The invention can be applied to an automobile, a train, a sensing system for preventing collision, a high speed tracking system, or the like.

According to the invention, a plurality of signals are taken out from one photoelectric conversion device by using floating bus lines and the signals are read out in parallel in the row and column directions, so that high speed processes of the signals can be executed.

In addition, the present invention can be applied to devices other than photoelectric conversion device, for example, a memory, a pyroelectric sensor and a pressure sensor. In such application of the present invention, an output of each sensor can be used as an input signal source.

What is claimed is:

1. A processing device comprising:
   (a) a plurality of storing elements arranged in a two-dimensional form;
   (b) first output means for outputting signals of said plurality of storing elements in parallel in a row direction; and
   (c) second output means for outputting the signals of said plurality of storing elements in parallel in a column direction.

2. A processing device according to claim 1, wherein said first output means includes floating bus lines.

3. A processing device according to claim 2, further comprising a capacitor for controlling a floating potential of said floating bus lines.

4. A processing device according to claim 3, wherein each storing element is connected to said floating bus lines through said capacitor.

5. A processing device according to claim 3 or 4, wherein signal of the storing element is read out through said capacitor in a direction different from the direction in which the potential of said floating bus lines is changed.

* * * * *

UNITED STATES PATENT AND TRADEMARK OFFICE
CERTIFICATE OF CORRECTION

PATENT NO. : 5,886,343

DATED : March 23, 1999

INVENTOR(S) : Mamoru MIYAWAKI, et al.

It is certified that error appears in the above-identified patent and that said Letters Patent is hereby corrected as shown below:

ON THE COVER PAGE:

AT [30] Foreign Application Priority Data:

"5-1270890" should read --5-127080--.

AT [56] References Cited, U.S. Patent Documents:

"Shinohra et al." should read --Shinohara et al.--.

COLUMN 2:

Line 31, "further another" should read --another further--.

Line 34, "further another" should read --another fu

Signed and Sealed this

Thirty-first Day of October, 2000

Attest:

Q. TODD DICKINSON

*Attesting Officer*  *Director of Patents and Trademarks*